US008570550B2

(12) United States Patent
Pothos et al.

(10) Patent No.: US 8,570,550 B2
(45) Date of Patent: Oct. 29, 2013

(54) METHOD AND SYSTEM FOR REMOTE MANAGEMENT OF PRINT DEVICES

(75) Inventors: Kirk V. Pothos, Webster, NY (US); Krishna Kumar, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1406 days.

(21) Appl. No.: 11/853,472

(22) Filed: Sep. 11, 2007

(65) Prior Publication Data

US 2009/0066994 A1  Mar. 12, 2009

(51) Int. Cl.
*G06F 3/12* (2006.01)

(52) U.S. Cl.
USPC .......... 358/1.15; 358/1.1; 358/1.16; 710/220; 709/223

(58) Field of Classification Search
USPC .............................. 358/1.15; 710/220; 700/17
See application file for complete search history.

(56) References Cited

U.S. PATENT DOCUMENTS

| | | | |
|---|---|---|---|
| 5,513,126 A | 4/1996 | Harkins et al. | |
| 5,615,015 A | 3/1997 | Krist et al. | |
| 5,625,757 A | 4/1997 | Kageyama et al. | |
| 6,452,692 B1* | 9/2002 | Yacoub | 358/1.15 |
| 6,487,457 B1* | 11/2002 | Hull et al. | 700/17 |
| 6,542,892 B1 | 4/2003 | Cantwell | |
| 6,665,425 B1 | 12/2003 | Sampath et al. | |
| 6,748,471 B1* | 6/2004 | Keeney et al. | 710/220 |
| 6,814,510 B1 | 11/2004 | Sabbagh et al. | |
| 6,900,905 B2 | 5/2005 | Simpson et al. | |
| 6,957,429 B1 | 10/2005 | Sekijima et al. | |
| 6,985,243 B1 | 1/2006 | Matsueda | |
| 6,986,133 B2 | 1/2006 | O'Brien et al. | |
| 7,051,003 B1 | 5/2006 | Kobata et al. | |
| 7,158,657 B2 | 1/2007 | Okazaki et al. | |
| 7,162,014 B2 | 1/2007 | Skladman et al. | |
| 7,177,043 B2* | 2/2007 | Qiao | 358/1.15 |
| 7,187,461 B2 | 3/2007 | Schlonski et al. | |
| 7,197,559 B2 | 3/2007 | Goldstein et al. | |
| 7,343,341 B2 | 3/2008 | Sandor et al. | |
| 7,574,545 B2* | 8/2009 | Keeney et al. | 710/220 |
| 7,574,546 B2* | 8/2009 | Keeney et al. | 710/220 |
| 7,580,144 B2 | 8/2009 | Wadley | |

(Continued)

OTHER PUBLICATIONS

The Wall Street Journal, Business Technology, "HP Executive's Quest for Ink", May 22, 2008, downloaded May 28, 2008, blogs.wsj.com/biztech/2008/5/22/h-p-executives-quest-for-ink.

(Continued)

*Primary Examiner* — Steven Kau
*Assistant Examiner* — Ashish K Thomas
(74) *Attorney, Agent, or Firm* — Fox Rothschild LLP

(57) ABSTRACT

A method of controlling a print device using an instruction corresponding to a command received from a remote location. A second server may transmit a query directed to a first server. The second server may be prevented from receiving unauthorized communication from the first server by a firewall. If the first server has a relevant command available, the second server may receive a response to the query. The response may include the relevant command. The second server may determine a print device for which the command is relevant. An instruction corresponding to the relevant command may be sent from the second server to the print device. Communication between the print device and the second server may not be restricted by the firewall. The printing device may implement the instruction. If the first server does not have a relevant command available, the transmitting may automatically repeat until the first server has a relevant command available.

16 Claims, 2 Drawing Sheets

(56) References Cited

U.S. PATENT DOCUMENTS

| | | |
|---|---|---|
| 7,587,468 B2 * | 9/2009 | Tenenbaum ................. 709/217 |
| 7,620,569 B2 | 11/2009 | Chiarabini et al. |
| 2002/0143693 A1 | 10/2002 | Soestbergen et al. |
| 2002/0165784 A1 | 11/2002 | Taggart et al. |
| 2002/0198984 A1 | 12/2002 | Goldstein et al. |
| 2003/0016978 A1 | 1/2003 | Sarmast et al. |
| 2003/0097426 A1 * | 5/2003 | Parry ........................... 709/220 |
| 2004/0075859 A1 * | 4/2004 | Jacobsen et al. ............. 358/1.15 |
| 2004/0100651 A1 | 5/2004 | Leone, III et al. |
| 2004/0184070 A1 | 9/2004 | Kiraly et al. |
| 2004/0239978 A1 | 12/2004 | Didriksen et al. |
| 2005/0033872 A1 | 2/2005 | Motoyama |
| 2005/0246577 A1 | 11/2005 | Okuhara et al. |
| 2006/0101137 A1 * | 5/2006 | Suto ............................. 709/223 |
| 2007/0255457 A1 | 11/2007 | Whitcomb et al. |
| 2007/0260405 A1 | 11/2007 | McConnell et al. |
| 2007/0294090 A1 | 12/2007 | Thieret et al. |
| 2008/0103657 A1 | 5/2008 | Norton et al. |
| 2009/0066994 A1 | 3/2009 | Pothos et al. |
| 2009/0234704 A1 | 9/2009 | Roher et al. |
| 2010/0149571 A1 | 6/2010 | Thieret et al. |

OTHER PUBLICATIONS

Rogers, L., TruthNews.US, "S 2191: The Carbon Credit Enslavement System", Intel Strike, Nov. 27, 2007, downloaded Apr. 25, 2008, www.truthnews.us/?p=1012.

* cited by examiner

METHOD AND SYSTEM FOR REMOTE MANAGEMENT OF PRINT DEVICES

CROSS REFERENCE TO RELATED APPLICATIONS

This application is related to U.S. patent application Ser. No. 11/853,374, titled "Remote Print Management," and filed on Sep. 11, 2007.

Not Applicable

BACKGROUND

It is often desirable for companies to provide print device product support or management from a location that is remote from that of the print device itself. A method for managing digital printers and servers via a network is found in U.S. Pat. No. 7,187,461. Sometimes, such support may be administered by a call center that receives and transmits requests or items of monitored data. Often a call center is operated by a business or company and is used to administer incoming product support or answer inquiries from a client. A call center agent may directly respond to issues raised by the calls or data. Alternatively, service representatives may be dispatched or assigned to handle the issues at a client location.

Remote support representatives may want to modify one or more settings or features of one or more printing devices within a client's firewall. However, it is typically difficult for the call center agent to directly interact with the client's printing device because the agent may not be able to retrieve information from inside, or pass new settings, functions or other data through, a company's firewall.

Often when a printing device inside a firewall needs to be upgraded, a hosted server may only upgrade the printing device after obtaining permission from the company's firewall administrator. In order for the remote agent to access the printing device from the hosted server, the company's firewall administrator must reconfigure the company's system to permit the external hosted server to interact with the printing device. Alternatively, in order for a remote call center agent to access information about the printing device, the call center agent would have to dispatch a service agent to the client's site.

SUMMARY

In an embodiment, a method of controlling a print device using an instruction corresponding to a command received from a remote location, may include transmitting, by a second server, a query directed to a first server. The second server may be prevented from receiving unauthorized communication from the first server by a firewall. If the first server has a relevant command available, the second server may receive a response to the query. The response may include the relevant command. The second server may determine a print device for which the command is relevant. The second server may send an instruction corresponding to the relevant command to the print device. Communication between the print device and the second server may not be restricted by the firewall. The print device may implement the instruction. If the first server does not have a relevant command available, the transmission may automatically repeat until the first server has a relevant command available.

In an embodiment, a plurality of print devices may be in communication with the second server without restriction by the firewall. Determining may include determining which of the plurality of print devices are relevant to the command. Sending may include sending the instruction corresponding to the command to each of the relevant print devices. In an embodiment, before sending, it may be determined whether the instruction satisfies a schema. If the instruction satisfies the schema, the instruction may be sent. In an embodiment, the second server may ensure that the instruction satisfies a protocol for communication with the print device.

In an embodiment, the instruction, corresponding to the relevant command, when executed by the print device, may cause the print device to perform at least one of the following actions: change a setting on the printing device, reboot the printing device, upgrade firmware in the printing device, retrieve consumable level information from the printing device, retrieve print meter information from the printing device, troubleshoot the printing device, and perform a test print on the printing device. In an embodiment, the command may further include a second instruction to be implemented by the second server and the method may include implementing, by the second server, the second instruction so that a setting is changed on the second server. In an embodiment, the command may further include a second instruction to be implemented by the second server, and the method may further include determining, by the second server, whether the command satisfies a schema. If the command satisfies the schema, the second server may execute the command on the second server.

The command, when executed by the second server, may cause the second server to perform at least one of the following actions: modify a discovery schedule, modify a discovery parameter, modify an alert generation criterion, modify a schedule to report asset information, and modify a schedule to report site information. In an embodiment, transmitting may include transmitting the query using hypertext transfer protocol.

In an alternate embodiment, a method of controlling a resource using an instruction corresponding to a command received from a remote location may include transmitting, by a second server, a query directed to a first server. The second server may be prevented from receiving unauthorized communication from the first server by a firewall. If the first server has a relevant command available, the second server may receive a response to the query. The response includes the relevant command. The second server may determine a print device for which the command is relevant. The second server may send an instruction to the resource corresponding to the relevant command. Communication between the resource and the second server may not be restricted by the firewall. The resource may implement the instruction. If the first server does not have a relevant command available, the transmitting may automatically repeat until the first server has a relevant command available.

BRIEF DESCRIPTION OF THE DRAWINGS

Aspects, features, benefits and advantages of the embodiments described herein will be apparent with regard to the following descriptions appended claims, and accompanying drawings where:

DETAILED DESCRIPTION

Figure 1:
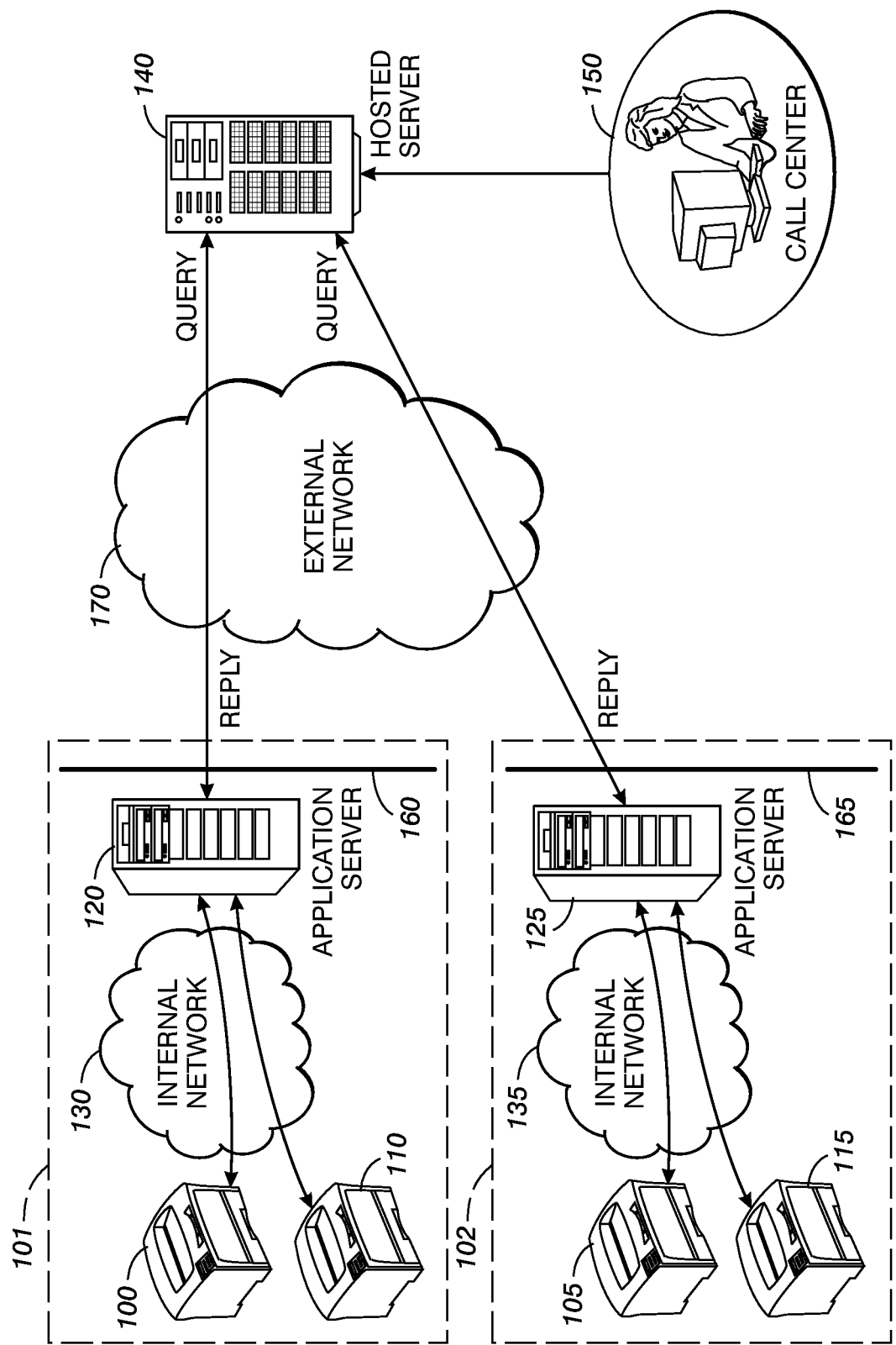
FIG. 1 depicts an exemplary system for managing print devices from a remote location according to an embodiment.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

A "resource" or "print resource" is a device that performs a processing function in a document production environment. A resource may include, but is not limited to, a printing device, a multifunction device such as a print/scan/copy/fax device, a router, a web application used in connection with a printing device and other devices. A printing device is an electronic device that is capable of receiving commands and printing text and/or images on a substrate and/or scanning a document. Printing devices may include, but are not limited to, network printers, production printers, copiers, facsimile devices, other devices using ink or toner, and scanners. As used herein, the terms ink and toner are used interchangeably to refer to wet or dry material that forms an image or text on a substrate. Printing devices may also perform a combination of functions such as printing/scanning/copying/faxing, in which ease such devices may be considered to be multifunctional devices.

An "application server" includes a processor, a processor readable storage medium, and a communication interface. The application server provides applications and/or software programs to monitor and/or control print resources.

A "hosted server" includes a processor, a processor readable storage medium and a communication interface. The hosted server stores and/or transmits a command to an application server.

A "firewall" is an information technology security device which is configured to permit or deny data connections between external devices and internal devices. Internal devices are devices protected by a firewall.

The terms "poll," "query" and "request" are used interchangeably herein to refer to the transmission by a first device of a request for information from a second device, where the poll includes identification, address or other unique data relating to each of the first device and second device.

A "call center" is an area outside of a firewall where communication is received and/or delivered regarding one or more resources within the firewall. For example, a company may operate a call center to answer and/or send information to a client site that contains a print resource provided by the company. A centralized entity may handle multiple companies and multiple print resources at a single location.

A "command" is a type of action associated with printing. In an embodiment a command may be executed on a print resource or an application server. A command which corresponds to an action to be implemented by a print device may be received by the application server. The application server may transmit an instruction, corresponding to the command, to be executed by the print resource. The instruction may include simple network management protocol (SNMP) and/or other print control protocols. For example, the instruction may be to reboot the print resource, troubleshoot the print resource, change a setting on the print resource, upgrade firmware in the print resource, retrieve consumable level information from the print resource, retrieve print meter information from the print resource, and/or perform a test print on the print resource. Alternatively, a command may be executed by an application server. For example, a command may change a setting on the application server.

A "setting" is a property or attribute of a target device, such as an application server. In an embodiment, a command may modify a setting on an application server. For example, a setting may determine the number or set of resources that an application server will monitor, the time period between polling and/or monitoring events, or other aspects of when and/or how an application server monitors a resource.

FIG. 1 depicts an exemplary system for managing print devices from a remote location according to an embodiment. The system may include one or more resources 100, 105, 110, 115 at one or more client sites 101, 102. The system may also include one or more application servers 120, 125 for each site. Each application servers may communicate with one or more of the resources within a client site via an internal network. The internal network may include, but is not limited to, a local area network (LAN), a wide area network (WAN), the Internet or another communications network including a wireless network. As shown in FIG. 1, a first client site 101 may have a first application server 120 that communicates with resources 100, 110 through a first internal network 130, and a second client site 102 may have a second application server 125 that communicates with resources 105, 115 through a second internal network 135. Additional client sites and/or alternate configurations of application servers and resources are possible and are considered to be within the scope of this disclosure.

The system may also include an external hosted server 140. The hosted server 140 may store and/or transmit information relating to print resources at one or more remote sites. In an embodiment, the information may be stored in, for example, a table, a database, a chart or any other file type of format. In an embodiment, the information may be stored in a processor readable storage medium. As shown in FIG. 1, the hosted server 140 may be located at a location that is remote from some or all of the client sites 101, 102.

The system may also include a call center 150. The call center 150 may monitor and/or receive communication from the hosted server 140 regarding the one or more resources 100, 105, 110, 115. Such communication may include, but is not limited to, a telephone call, an e-mail and a facsimile. In an embodiment, the hosted server 140 may be co-located with the call center 150. In an alternate embodiment, the hosted server 140 may be remote from the call center 150.

Each customer site may include a firewall 160, 165 that prevents unauthorized communications between a device within the firewall and a device outside the firewall. For example, the firewall 160 may prohibit the call center 150 and/or the hosted server 140 (i.e., external devices) from initiating communication with the one or more resources 100, 110, and the one or more application servers 120 (i.e., internal devices within the firewall 160). Data retrieved from external devices must satisfy security criteria before the data is passed through the firewall 160 to the internal devices.

The external devices and the internal devices may communicate over an external network 170. The external network 170 is a network that includes devices outside the firewall, such as a local area network (LAN), a wide area network (WAN), the Internet or another communications network including a wireless network. In an embodiment, an application server 120 or 125 may communicate with the hosted server 140 through the firewall 160 and the external network 170 to obtain a command from the hosted server 140.

Each application server may include program instructions to periodically poll the hosted server for new commands. A communication session may be initiated when an application server, such as 120, issues a request, such as a hypertext transfer protocol (HTTP) request, to the hosted server 140. A command from the hosted server 140 may then be permitted to pass through the firewall 160 because it is in response to the query from the application server 120.

The one or more application servers 120, 125 may include program instructions to periodically or intermittently poll the hosted server 140 to determine whether the hosted server received a new command from the call center 150 or elsewhere. For example, the one or more application servers 120, 125 may separately poll the hosted server 140 for new commands every five minutes, hourly, daily, at some other configurable time interval, or at some other random or pseudo-random time interval.

Figure 2:
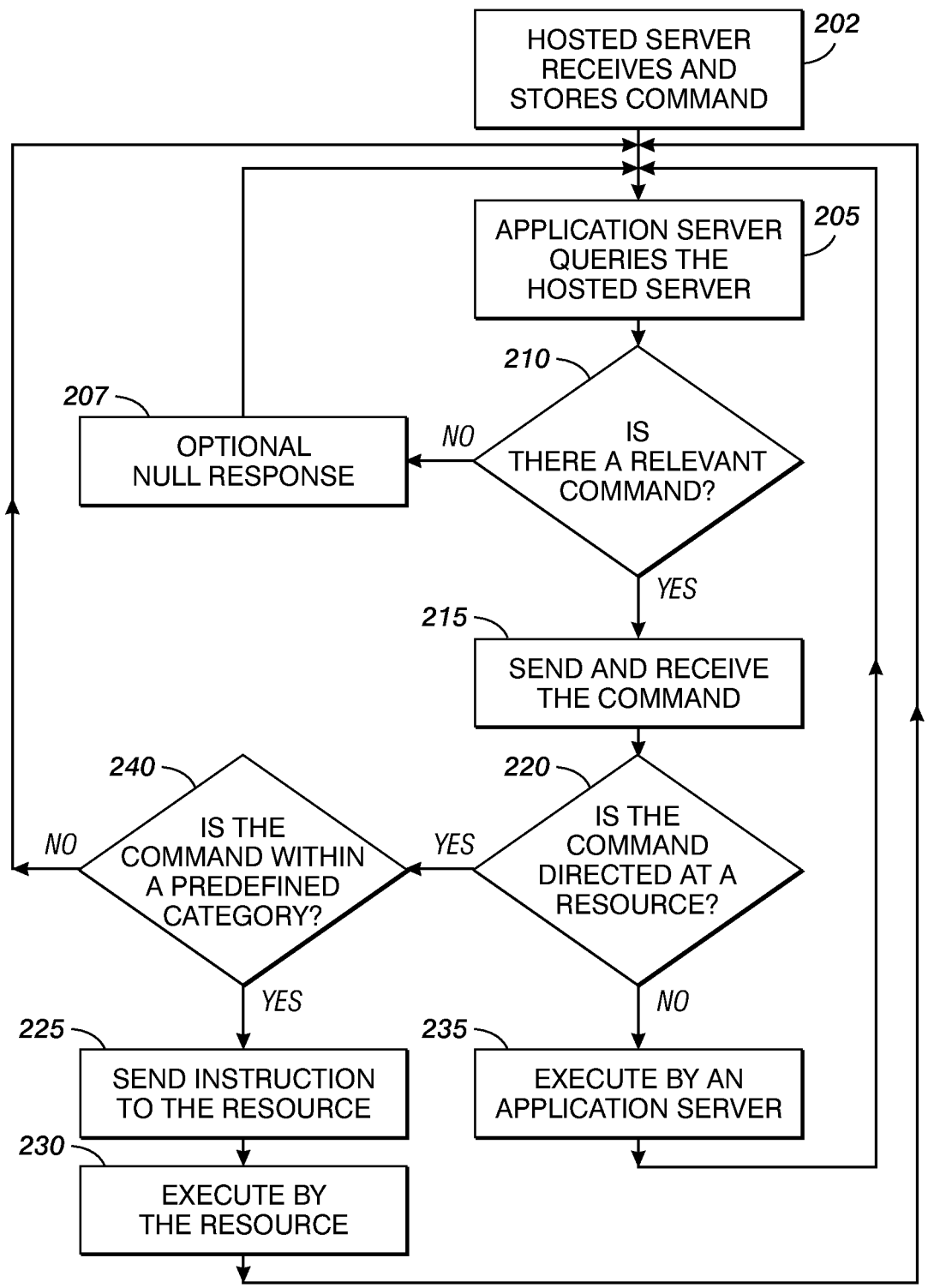
FIG. 2 depicts an exemplary method of executing a command using a hosted server and an application server according to an embodiment.

FIG. 2 depicts an exemplary method of executing a command using a hosted server and an application server according to an embodiment. According to FIG. 2, a hosted server may receive a command 202 from a call center or from another source. The hosted server may store the command and wait to be queried by one or more application servers. An application server may transmit a request 205 that is directed to the hosted server. In an embodiment, the application server may communicate 205 with the hosted server after a preselected period, a periodic period, a random period, a sporadic period or a configurable period. In an embodiment, a setting on the application server may determine how often the application server queries 205 the hosted server. In an embodiment, the hosted server may be queried 205 by multiple application servers.

In some embodiments, the hosted server may be a web server that delivers web pages or other information in Hypertext Transfer Protocol (HTTP) or a similar protocol. In such an embodiment, the application server may poll 205 the hosted server using an HTTP or similar request.

When the application server polls or queries 205 the hosted server, the hosted server may determine 210 whether a relevant command has been posted at the hosted server since receipt of the application server's previous query. A command is relevant to the application server if it is a command for the application server itself, or if the command corresponds to an action to be implemented on one or more of the print servers with which the application server communicates inside the application server's firewall.

If a relevant command has not been posted at the hosted server, the hosted server may either send a null (no command response) 207, or it may simply send no response at all. The application server may then wait a preselected, calculated, variable, random or configurable length of time before polling 205 the hosted server again.

If a relevant command has been posted at the hosted server, the hosted server may send and the application server may receive 215 the command. In an embodiment, the command may be downloaded or transmitted from the hosted server to the application server. In an embodiment, the command may be transferred through a communications network via an HTTP response. Other methods of delivery are possible.

The command may be a single command or a portion of a bundled set of commands. The application server may review and parse the command to determine 220 the resource(s) to which the command is directed as well as whether the command is directed toward the application server itself. If the command is directed toward a resource, the application server may send 225 an instruction, corresponding to the command, to be executed by the print resource. The instruction may include simple network management protocol (SNMP) and/or other print control protocols. In an embodiment, the instruction may be sent 225 to a plurality of resources at a client site. In an embodiment, the instruction may be sent 225 to one or more specified resources. The instruction may be performed or executed 230 by the resource. For example, the instruction may be executed 230 to obtain information from the resource, change a setting on the resource, reboot the resource, establish a network connection, upgrade or update firmware in the resource, retrieve consumable level information from the resource, retrieve print meter information from the resource, troubleshoot the resource, and/or perform a test print using the resource.

In some embodiments, the application server may determine 240 whether the command is within a pre-defined category for which execution of the command is permitted. For example, an agreed-upon schema may identify commands that may be exchanged between the application server and the hosted server. If a command is not within that schema, it may not be executed or further delivered.

If the command is not directed toward a resource, the command may be directed toward the application server. In an embodiment, the command, when executed, may modify or change a setting on the application server. The application server may execute 235 the command. In an embodiment, the setting may determine when an application server interacts with one or more resources. In an alternate embodiment, the setting may determine what information is collected from a resource. For example, the command may be executed 235 to modify an application server's parameters and/or schedule, modify an application server's alert generation criteria, and/or modify the frequency with which the application server reports asset and/or site information.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of controlling a print device using an instruction corresponding to a command received from a remote location, comprising:
    transmitting, by a second server, a query directed to a first server, wherein the second server is prevented from receiving unauthorized communication from the first server by a firewall, a plurality of print devices are in communication with the second server without restriction by the firewall, and the query is to determine whether a command has been posted at the first server for one of the plurality of print devices;
    if the first server has a relevant command available:
        receiving, by the second server, a response to the query, wherein the response includes the relevant command,
        determining, by the second server, which of the plurality of print devices are relevant to the relevant command,
        sending, from the second server to each of the relevant print devices, a support instruction corresponding to the relevant command, wherein communication between the print device and the second server is not restricted by the firewall, and
        implementing, by the print device, the product support instruction,
    wherein the relevant command further includes a second product support instruction to be implemented by the second server, and the method comprises implementing, by the second server, the second product support instruction so that a setting is changed on the second server; and if the first server does not have a relevant command available, automatically repeating the transmitting until the first server has a relevant command available.

2. The method of claim 1, further comprising:
before the sending, determining whether the relevant command is within a category for which execution of the command is permitted; and
only sending the product support instruction if the relevant command is within the category.

3. The method of claim 1, further comprising:
ensuring, by the second server, that the product support instruction satisfies a protocol for communication with the print device.

4. The method of claim 1 wherein the product support instruction corresponding to the relevant command, when executed by the print device, will cause the print device to perform at least one of the following actions:
reboot the printing device; and
troubleshoot the printing device.

5. The method of claim 1 wherein the transmitting comprises transmitting the query using hypertext transfer protocol.

6. The method of claim 1 wherein the product support instruction corresponding to the relevant command, when executed by the print device, will cause the print device to perform at least one of the following actions:
retrieve consumable level information from the printing device; and
retrieve print meter information from the printing device.

7. A method of controlling a print device using an instruction corresponding to a command received from a remote location, comprising:
transmitting, by a second server, a query directed to a first server, wherein the second server is prevented from receiving unauthorized communication from the first server by a firewall, a plurality of print devices are in communication with the second server without restriction by the firewall, and the query is to determine whether a command has been posted at the first server for one of the plurality of print devices;
if the first server has a relevant command available:
receiving, by the second server, a response to the query, wherein the response includes the relevant command,
determining, by the second server, which of the plurality of print devices are relevant to the relevant command,
sending, from the second server to each of the relevant print devices, a support instruction corresponding to the relevant command, wherein communication between the print device and the second server is not restricted by the firewall, and
implementing, by the print device, the product support instruction by performing at least one of the following actions:
rebooting the printing device;
troubleshooting the printing device; and
wherein the relevant command further includes a second product support instruction to be implemented by the second server, and the method further comprises:
determining, by the second server, whether the relevant command is within a category for which execution of the command is permitted; and
if the command satisfies the category, executing, by the second server, the command on the second server; and if the first server does not have a relevant command available, automatically repeating the transmitting until the first server has a relevant command available.

8. The method of claim 7 wherein the relevant command, when executed by the second server, will cause the second server to perform at least one of the following actions:
modify a discovery schedule;
modify a discovery parameter;
modify an alert generation criterion;
modify a schedule to report asset information; and
modify a schedule to report site information.

9. A method of controlling a resource using an instruction corresponding to a command received from a remote location, comprising:
transmitting, by a second server, a query directed to a first server, wherein the second server is prevented from receiving unauthorized communication from the first server by a firewall, a plurality of resources are in communication with the second server without restriction by the firewall, and the query is to determine whether a command has been posted at the first server for one of the plurality of resources;
if the first server has a relevant command available:
receiving, by the second server, a response to the query, wherein the response includes the relevant command,
determining, by the second server, which of the plurality of resources are relevant to the relevant command,
sending, from the second server to each of the relevant resources, a product support instruction corresponding to the relevant command, wherein communication between the resource and the second server is not restricted by the firewall, and
implementing, by the resource, the product support instruction,
wherein the command further includes a second product support instruction to be implemented by the second server, and the method comprises implementing, by the second server, the second product support instruction so that a setting is changed on the second server; and
if the first server does not have a relevant command available, automatically repeating the transmitting until the first server has a relevant command available.

10. The method of claim 9, further comprising:
before the sending, determining whether the relevant command is within a category for which execution of the command is permitted; and
only sending the product support instruction if the relevant command is within the category.

11. The method of claim 9, further comprising:
ensuring, by the second server, that the product support instruction satisfies a protocol for communication with the resource.

12. The method of claim 11 wherein the product support instruction corresponding to the relevant command, when executed by the resource, will cause the resource to perform at least one of the following actions:
reboot the resource;
upgrade firmware in the resource; and
troubleshoot the resource.

13. The method of claim 9 wherein the transmitting comprises transmitting the query using hypertext transfer protocol.

14. The method of claim 9 wherein the product support instruction corresponding to the relevant command, when executed by the resource, will cause the resource to perform at least one of the following actions:

retrieve consumable level information from the resource; and retrieve print meter information from the resource.

15. A method of controlling a resource using an instruction corresponding to a command received from a remote location, comprising:

transmitting, by a second server, a query directed to a first server, wherein the second server is prevented from receiving unauthorized communication from the first server by a firewall, a plurality of resources are in communication with the second server without restriction by the firewall, and the query is to determine whether a command has been posted at the first server for one of the plurality of resources;

if the first server has a relevant command available:

receiving, by the second server, a response to the query, wherein the response includes the relevant command, determining, by the second server, which of the plurality of resources are relevant to the relevant command, sending, from the second server to each of the relevant resources, a product support instruction corresponding to the relevant command, wherein communication between the resource and the second server is not restricted by the firewall, and implementing, by the resource, the product support instruction by performing at least one of the following actions:

rebooting the resource;

upgrading firmware in the resource; and troubleshooting the resource, wherein the command further includes a second product support instruction to be implemented by the second server, and the method further comprises:

determining, by the second server, whether the relevant command is within a category for which execution of the command is permitted; and if the command satisfies the category, executing, by the second server, the command on the second server; and if the first server does not have a relevant command available, automatically repeating the transmitting until the first server has a relevant command available.

16. The method of claim 15, wherein the command, when executed by the second server, will cause the second server to perform at least one of the following actions:

modify a discovery schedule;

modify a discovery parameter;

modify an alert generation criterion;

modify a schedule to report asset information; and modify a schedule to report site information.

\* \* \* \* \*